June 23, 1970     G. L. LANDWEHR ET AL     3,516,386

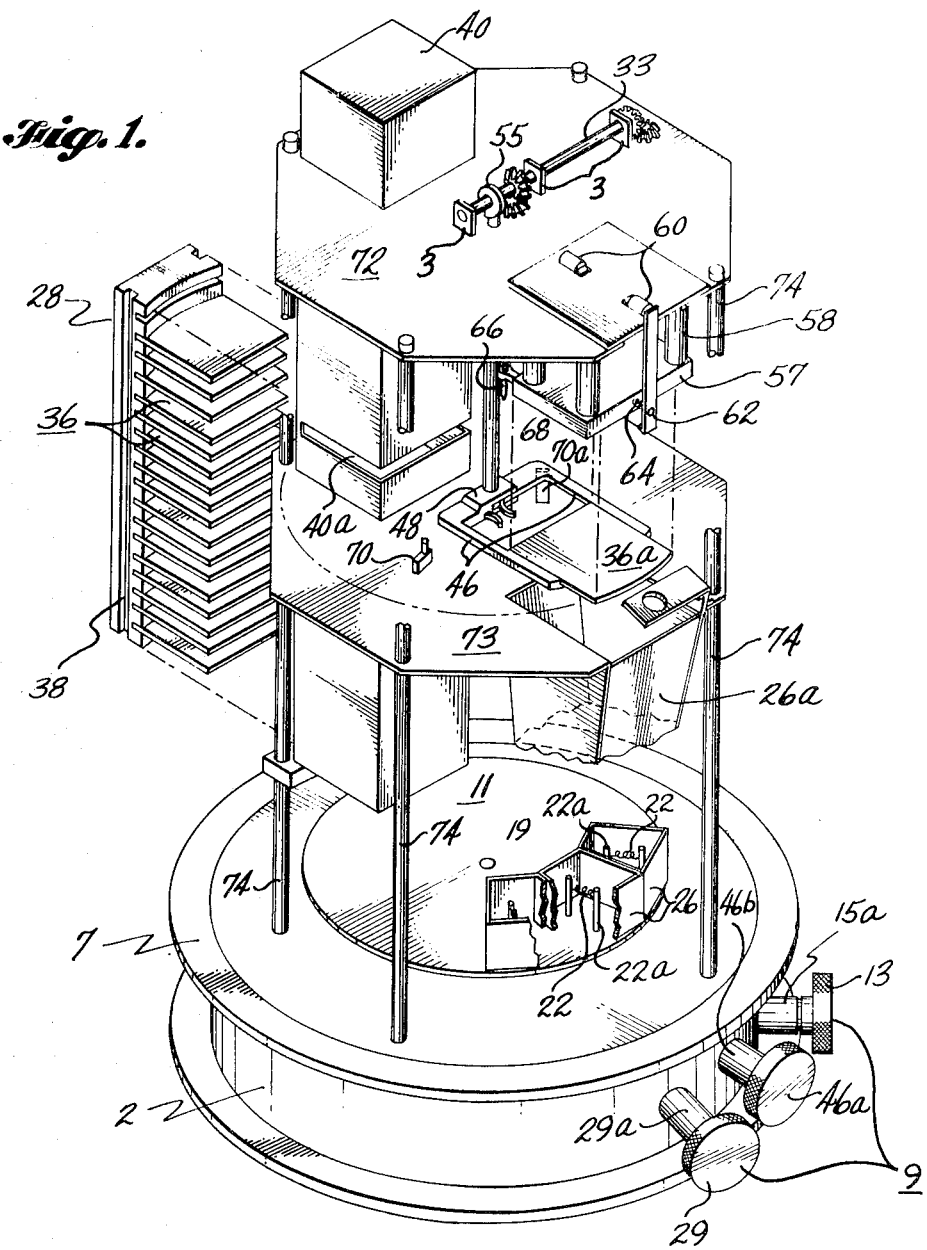

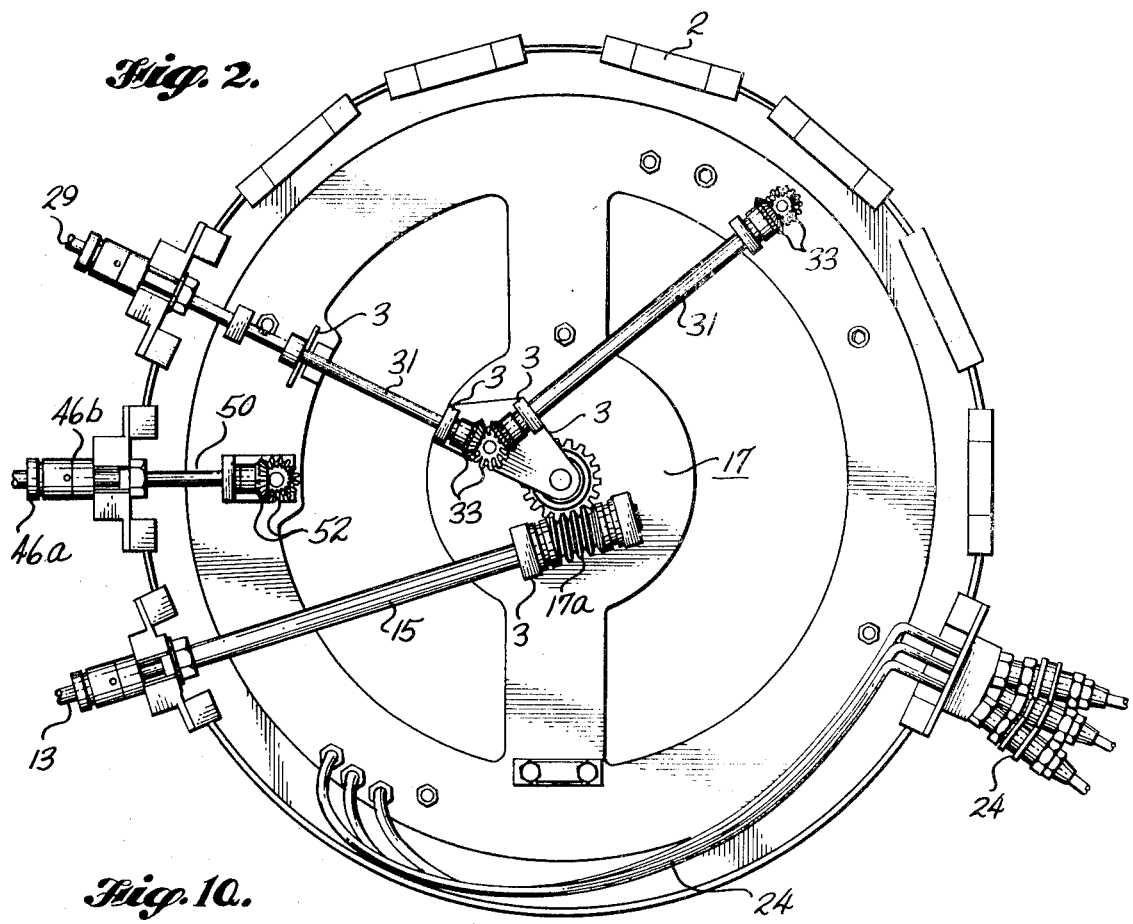
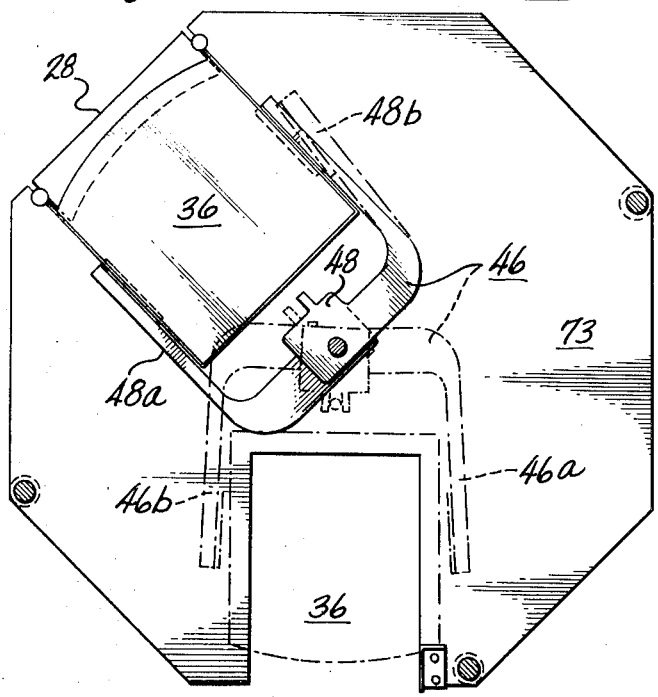

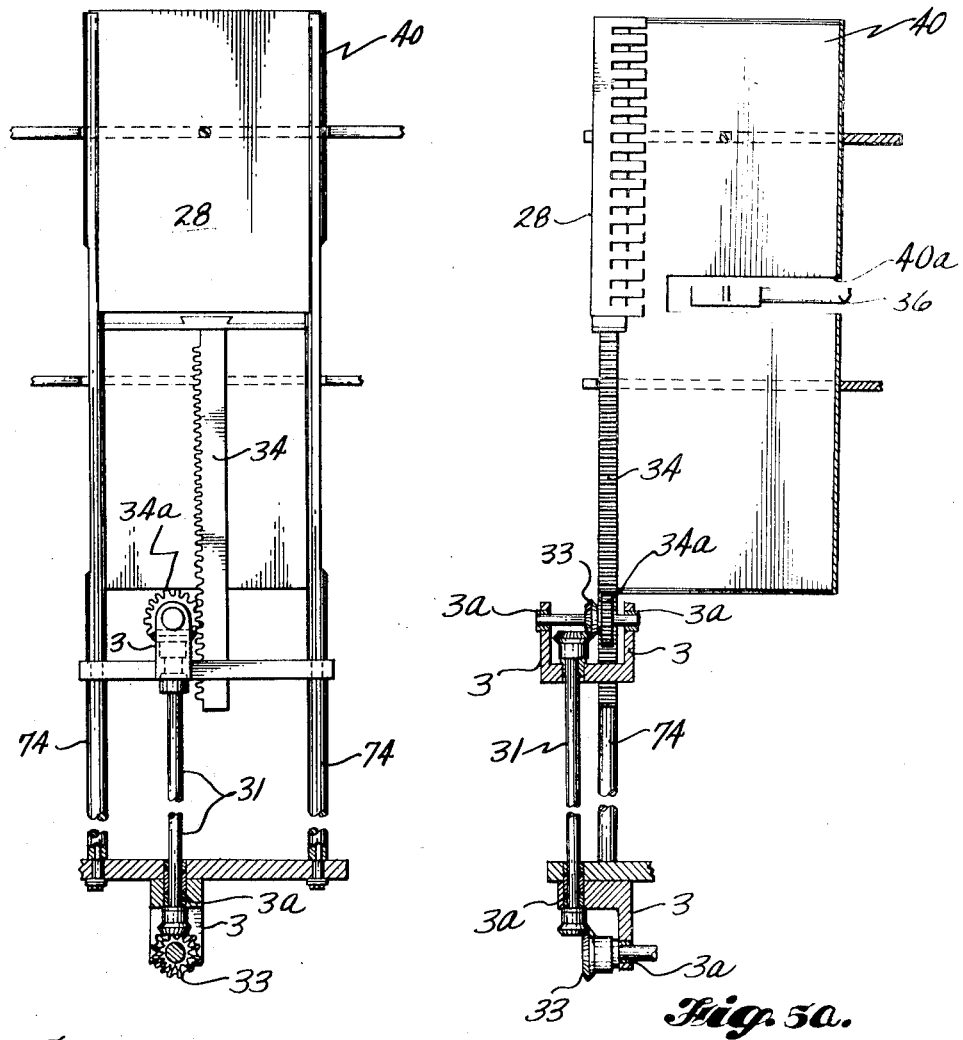

THIN FILM DEPOSITION FIXTURE

Filed July 16, 1965     8 Sheets-Sheet 7

INVENTOR.
CHARLES A. SCHINDLER
GILBERT L. LANDWEHR

BY

ATTORNEY

June 23, 1970 G. L. LANDWEHR ET AL 3,516,386
THIN FILM DEPOSITION FIXTURE
Filed July 16, 1965 8 Sheets-Sheet 8

INVENTOR.
CHARLES A. SCHINDLER
GILBERT L. LANDWEHR
BY
ATTORNEY

United States Patent Office 3,516,386
Patented June 23, 1970

3,516,386
THIN FILM DEPOSITION FIXTURE
Gilbert L. Landwehr and Charles A. Schindler, Seattle, Wash., assignors to The Boeing Company, Seattle, Wash., a corporation of Delaware
Filed July 16, 1965, Ser. No. 472,473
Int. Cl. C23c 13/08
U.S. Cl. 118—49                                    3 Claims

ABSTRACT OF THE DISCLOSURE

A thin film deposition fixture for forming electrical circuit patterns on a substrtae within a vacuum chamber having a storage magazine retaining a plurality of substrates and masks between the storage magazine and the anism for holding a substrate and mask in registration against the heater; a rotating clamp for transferring substrates and masks between the storage magazine and the substrate heater; and a turntable containing a plurality of evaporant materials and provided with means for selecting an evaporant for deposition of a thin film circuit on the substrate.

---

The present invention relates to apparatus for evaporating a material and depositing the evaporated material onto a target, and more particularly to apparatus providing means of material deposition in the manufacture of circuit components or complete circuits through the use of various sizes of masks and substrates. The apparatus of the instant invention can be used for single deposition circuit manufacture such as for particular research and development circuitry calling for just one or two components or for large quantities in the manufacture of standard parts.

Existing film deposition fixtures are inferior to the instant invention in that the time and cost of operation and maintenance is excessive and the techniques of indexing to obtain repeatability of registration in superimposing alternate layers of film on a substrate are inadequate.

An object of the instant invention is to provide indexing means to obtain repeatability of registration between a substrate and a mask so as to achieve alternate layers of film deposition within short periods of time.

A second object of the instant invention is to provide means for film deposition wherein said means can easily be cleaned after a series of operations.

A third object of the instant invention is to provide thin film deposition in an apparatus which combines ease of loading the apparatus with varying masks with ease of operation.

A further object of the instant invention is to provide means wherein a thin film deposition apparatus contains features whereby the mask and substrate sizes can be varied over wide limits without rework of the entire apparatus.

A still further object of the instant invention is to provide apparatus whereby a great reduction in time and cost of operation and maintenance is realized.

In apparatus for depositing a film on a substrate, the instant invention includes indexing means in combination therewith to provide rapid registration between any desired number of a plurality of substrates or articles to be coated, and any desired number of a plurality of masks and coating material sources.

A feature of the instant invention provides means whereby a multiple number of mask and substrate holders are disposed in a predetermined arrangement such that many operations and different circuit patterns may be formed without need for tearing down the apparatus and subsequent rebuilding.

A preferred embodiment of the present invention comprises an apparatus having means defining a chamber having a reduced internal pressure, means arranged to provide repeatability of referencing within said apparatus between a material to be vaporized and a substrate and mask upon which the material is to be deposited.

In particular, a rotatable support is provided on which a number of material sources are disposed in indexed fashion; selection means are provided whereby an operator can select at will a particular material source and position it within said apparatus for vaporization. In combination therewith is provided a movable magazine into which are placed indexed substrates and masks. Selection means are again provided so that an operator can select the substrate and mask patterns desired by referencing the movable magazine until the desired mask is positioned and available for removal from the magazine and for placement in combination with a substrate selected in similar manner. The operator is also provided with means to so remove the masks and substrates and correctly position them in repeatable fashion with respect to the selected material sources within said partial vacuum apparatus without need of tear down and re-creation of the vacuum.

The novel features which are considered as characteristic of the invention are set forth in particular in the appended claims. The invention itself, however, both as to its construction and its method of operation, together with additional objects and advantages thereof, will best be understood with reference to the following description of specific embodiments when read in connection with the accompanying drawings in which:

FIG. 1 is an isometric elevation view of the instant invention omitting the vacuum cover jar;

FIG. 1a is a section plan view of the elevation view of FIG. 1;

FIG. 2 is a detail of the underside plan of the embodiment shown in FIG. 1;

FIG. 5 is a portion of the elevation shown in FIG. 1 wherein certain gearing means are detailed;

FIG. 5a is a rotated view of the view shown in FIG. 5;

Referring to FIG. 1, the preferred embodiment of the instant invention includes means defining a chamber having a reduced internal pressure for coating article surfaces. The means defining a chamber include a suitable rigid support or base 2 having circular configuration. A bell jar support surface 7, having a machined finish, is disposed to receive a stainless steel housing (not shown) of the so-called inverted bell-jar type. The stainless steel housing (not shown) is coaxially mounted upon the support surface 7 and maintained in place by the reduced internal pressure within the chamber defined by the stainless steel housing. A portion of the stainless steel housing (not shown) is provided with a transparent window for viewing the apparatus during operation. The stainless steel housing is gas tight and when seated on surface 7 is sealed gas tight to the support member base 2. A side conduit (not shown) is connected to a diffusion pump (not shown) and serves as a source of vacuum for evacuating the interior of the stainless steel housing (not shown).

The embodiment of FIG. 1 can conveniently be described by referring to a first portion and a second portion of the apparatus of FIG. 1. In combination with the means defining a chamber having a reduced internal pressure for coating article surfaces, a first or lower portion of the embodiment of FIG. 1 includes indexing means 9 to provide repeatability of registration between any desired number of a plurality of substrates or articles to be coated, and any desired number of a plurality of masks and coating materials sources. The indexing or rotatable selection means 9 are shown attached to base 2. Each of the individual selection means 9 will be more fully described below. In particular, means are provided in the first portion of the embodiment of FIG. 1 for selecting a material to be vaporized. A turnable mounting means actuator 13 is shown supported on base 2 in FIG. 1.

Figure 3:
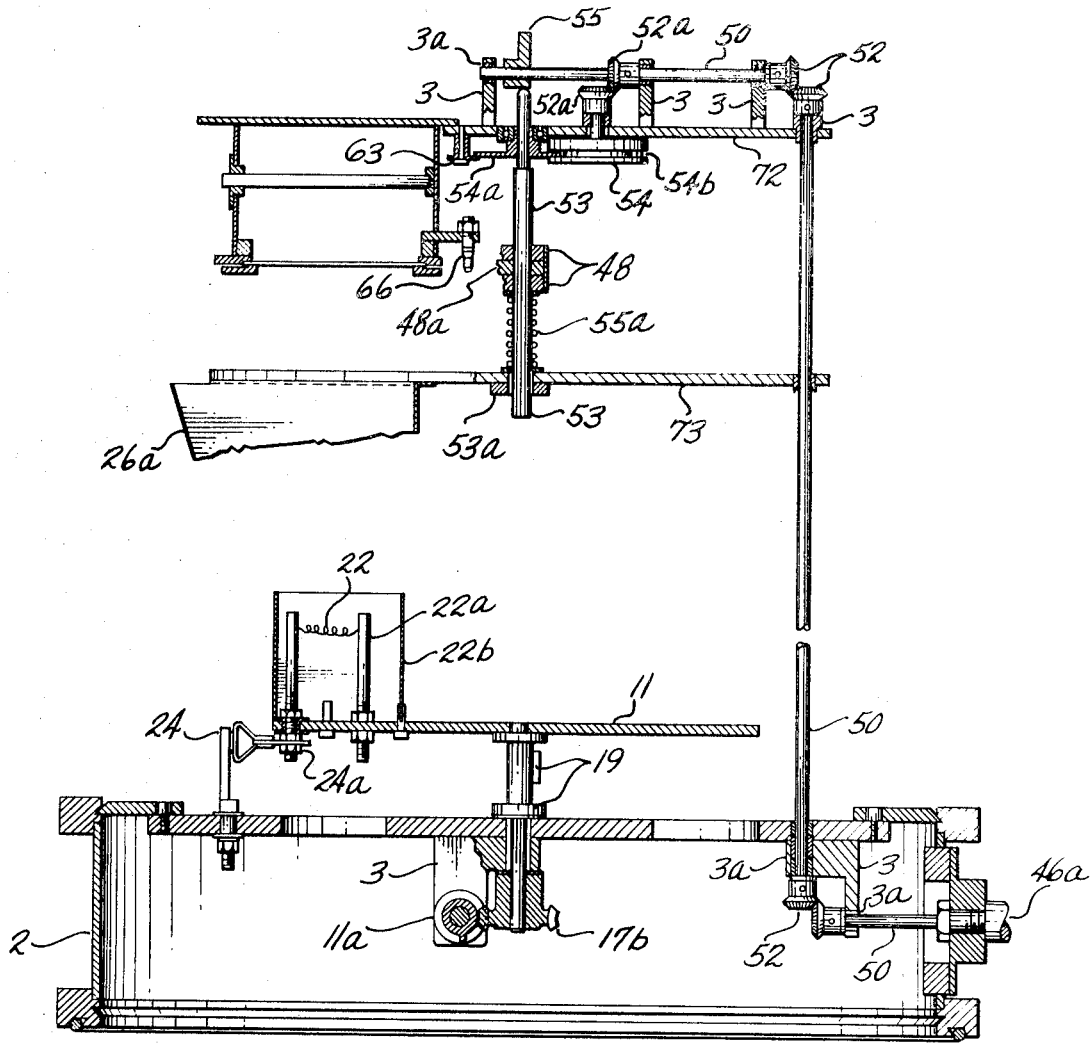
FIG. 3 is a section elevation of the embodiment shown in FIG. 1.
Figure 4:
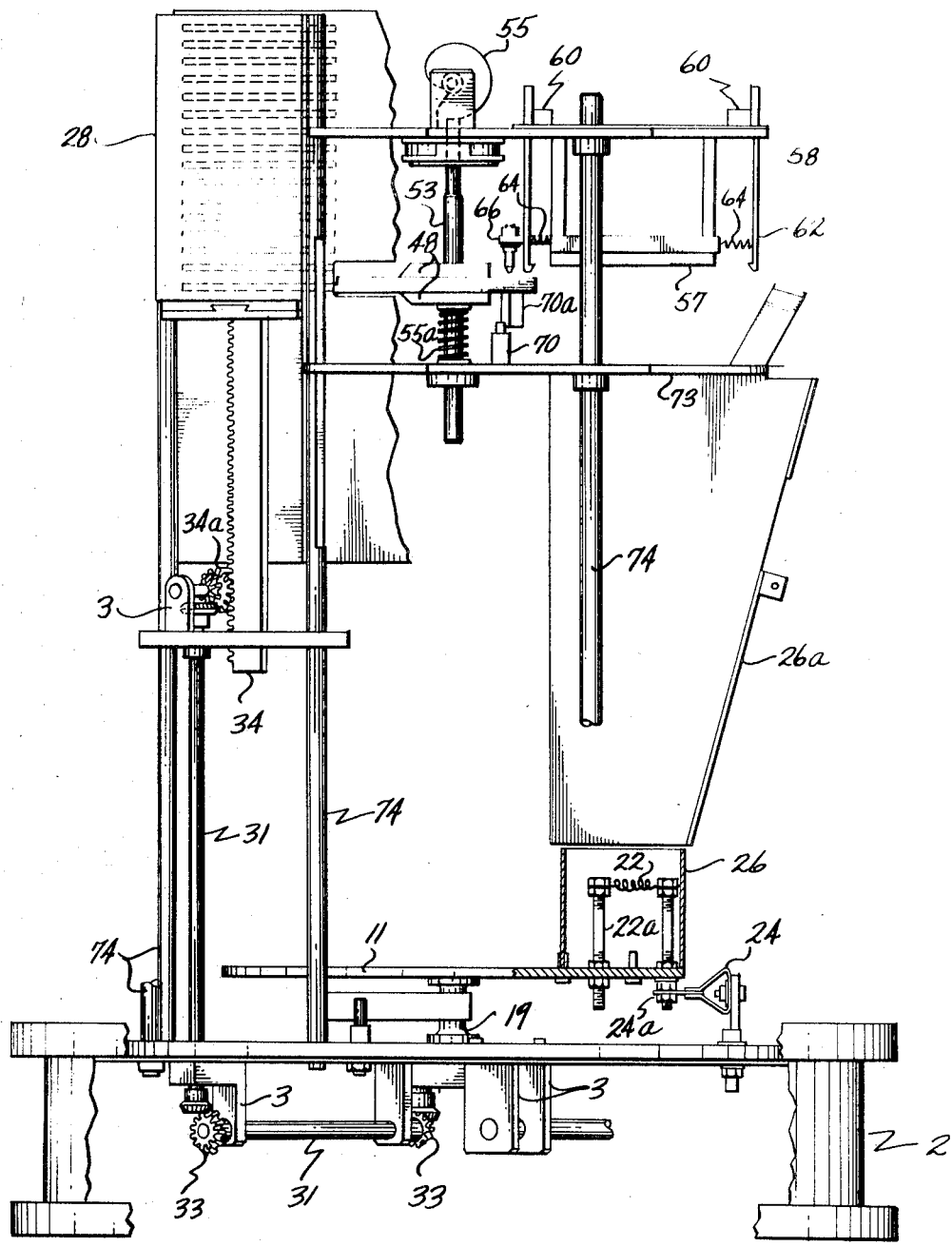
FIG. 4 is a second section elevation of the embodiment shown in FIG. 1.

In FIG. 2, a view is shown of the under side of the base 2 or first portion of the apparatus as shown in FIG. 1. Actuator 13 is disposed to be actuated by any convenient method, e.g., by hand, and as shown in FIG. 1 is on the exterior of the base 2 and therefore not within the partial vacuum portion of the apparatus. As seen in FIG. 2, actuator 13 is integrally connected to a drive shaft 15. As seen in FIG. 1, the drive shaft 15 is disposed to turn in a journal-bearing support 15a and drives a gearing means 17 shown in FIG. 2. A gear 17a is integrally connected to the shaft 15 and is disposed to drive a gear 17b as actuator 13 is actuated. As shown in the figures generally, brackets 3 and journals 3a provide additional support for the individual shafts and gears. In FIG. 3, gear 17b is rotatably connected to a shaft and spindle support 19. The spindle 19 in turn is fixed to and supports turnable mounting means 11 seen in FIG. 1 and FIG. 3 such that on actuation of actuator 13, gear 17b is driven in cooperation with gear 17a which in turn causes turnable mounting means 11 to rotate. As shown in FIGS. 1 and 3, a plurality of deposition source materials 22 and their corresponding paired source material supports 22a are disposed circumferentially upon means 11. Each of the support pairs 22a has an electrical contact means 24a which is disposed beneath mounting means 11 in fixed relationship to one of each of said pair of supports 22a. The actuator 13 has a dial on its face having set positions thereon corresponding to said positions of the various material source 22 stations on mounting means 11. By turning actuator 13 a designated number of turns as dictated by the dial on actuator 13, a selective material source 22 can be positioned with respect to a source of potential 24 as shown in FIG. 3 so that electrical contact is made between 24 and 24a. Each source material 22 is surrounded by a shield 26 and a vaporization channel 26a extends from a first fixed horizontal support 73, as shown in FIG. 1 and FIG. 4, into close relationship with one of the shields 26 so as to prevent source 22 vaporized deposition material from dispersing in a direction other than the direction in which the shield means 26 and 26a provide.

Thus it is seen with reference to FIGS. 1 through 4 that the material selection means arranged in the first portion of the instant invention provide selection of a material 22 to be evaporated by bringing a particular material source 22 station that is desired into electrical contact between the electrical contact means 24a and potential source 24 by actuation of turnable mounting means actuator 13. As voltage is applied through source 24, the source material 22 vaporizes and is directed upward and prevented from dispersing other than in the space defined by shield 26 and 26a.

Figure 4A:
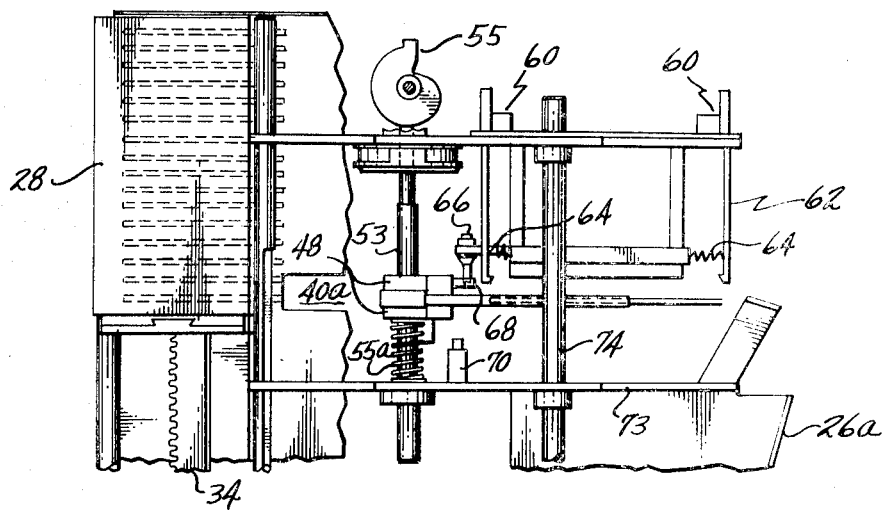
FIG. 4a is a top section of the elevation shown in FIG. 1.

As shown in FIG. 1, means are arranged in a second or upper portion of the instant invention containing an adjustable, movable means or mask and substrate magazine 28 disposed to support a plurality of masks and substrates 36. The magazine 28 has key slots 38 and fixed vertical supports 74 are disposed within the key slots 38 so that the magazine 28 can translate thereon. An opening 40a, as shown in FIG. 4a, in the magazine container 40 provides access to the masks and substrates 36 supported in magazine 28. The masks and substrates 36 are removed from magazine 28 through opening 40a by substrate and mask clamp 46 to be described below.

With reference to FIG. 1, a mask and substrate selector dial 29 is shown attached to the base 2, disposed to turn in journal 29a. The dial 29 has indicator means thereon whereby any desired mask or substrate 36 supported in magazine 28 may be referenced so that the desired mask 36b or substrate 36a may be removed through opening 40a by clamp 46.

As best seen in FIGS. 2 and 4, the magazine selector 29 is actuated in any number of convenient ways (e.g., by hand). Dial 29 actuates suitably supported drive means 31, including gearing means 33. A rack 34, integrally connected to magazine 28, translates in response to its associated rack pinion gear 34a interconnected to be driven by drive means 31. Thus, with reference to FIGS. 1 through 5, excluding FIG. 3, it is clear that rotational movement induced upon magazine selector dial 29 is translated into reciprocating movement of rack 34 shown in FIG. 4 and FIG. 5, such that the magazine 28, connected to rack 34, is disposed to translate on vertical fixed supports 74. By referencing the indicators on the selector dial 29, a particular mask or substrate is brought into positional relationship with respect to opening 40a in magazine container 40 so as to be readily removed by substrate and mask clamp 46 during various stages of the operation of the instant apparatus. By the means described above, a particular source material 22 is selectable by actuator 13 for deposition on a particular substrate in a pattern dictated by a particular mask as referenced in magazine 28 with respect to opening 40a by dial 29.

Cooperatively associated with the turnable mounting means 11 and its corresponding drive means 11 and its corresponding drive means 15, disposed in the first portion of the instant invention, and with the mask and substrate magazine 28 and its corresponding drive means 31 which are generally related to the second portion of the instant invention, is a substrate and mask clamp 46 and its corresponding actuator means 50 suitably supported to translate and rotate clamp 46, generally associated with the second portion of the instant invention.

As shown in FIG. 1, a substrate and mask clamp actuator dial 46a is supported to rotate within journal 46b and is disposed as a part of the rotatable selection means 9 connected to base 2. The clamp actuator 46a is disposed to be actuated by any convenient means and in turn to actuate suitably supported drive means 50 which includes connected gearing means 52 associated as best shown in FIG. 1 and FIG. 3. With reference to FIG. 1 and FIG. 3, a second fixed horizontal support 72 is shown supported by the fixed vertical supports 74. Horizontal support 72 in turn supports a portion of the drive means 50.

In FIG. 3, the two bevel gears 52a which form in part the gearing means 52 are disposed to cooperate with a cam 55, a Geneva wheel 54 and a substrate and mask clamp support member 53 in the following manner so as to effectuate translation and rotation of clamp 46. Cam 55 and Geneva wheel 54, as shown in FIG. 3, are disposed to rotate with drive means 50 as the drive means 50 is actuated by substrate and mask clamp actuator 46a. The action which cam 55 has upon reciprocating substrate and mask clamp support member 53 can be seen with reference to FIG. 3 and FIG. 4. As cam 55 is caused to rotate by drive means 50 from the position as shown in FIG. 3 and FIG. 4a, support member 53 is disposed to translate downward from the position as shown in FIG. 3 and FIG. 4a so that a hinge 48 biases against biasing means 55a until cam 55, support member 53 and bias means 55a reach the position shown in FIG. 4. At the same time that cam 55 drives against support member 53, gearing means 52a (referring to FIG. 3) actuates Geneva wheel 54 to rotate until stop 54b comes into contact with a cam slot (not shown) in a wheel flange 54a. Flange 54a is disposed concentric about support 53 and affixed thereto in such a manner as to prevent rotation of flange 54a independently of support 53. This may be accomplished, for example, by making a squared shaft design for support 53 upon which flange 54a is fitted. Flange 54a is supported from sliding downward on member 53 by a flanged bracket 63 support and groove in Geneva wheel 54 as shown in FIG. 3. In this manner, support 53 may slidably translate within flange 54a and support 53 will rotate with flange 54a as the latter is driven by stop 54b. The rotation of support 53 and concomitant rotation of substrate and mask clamp holder 46 will be described below.

Figure 6:
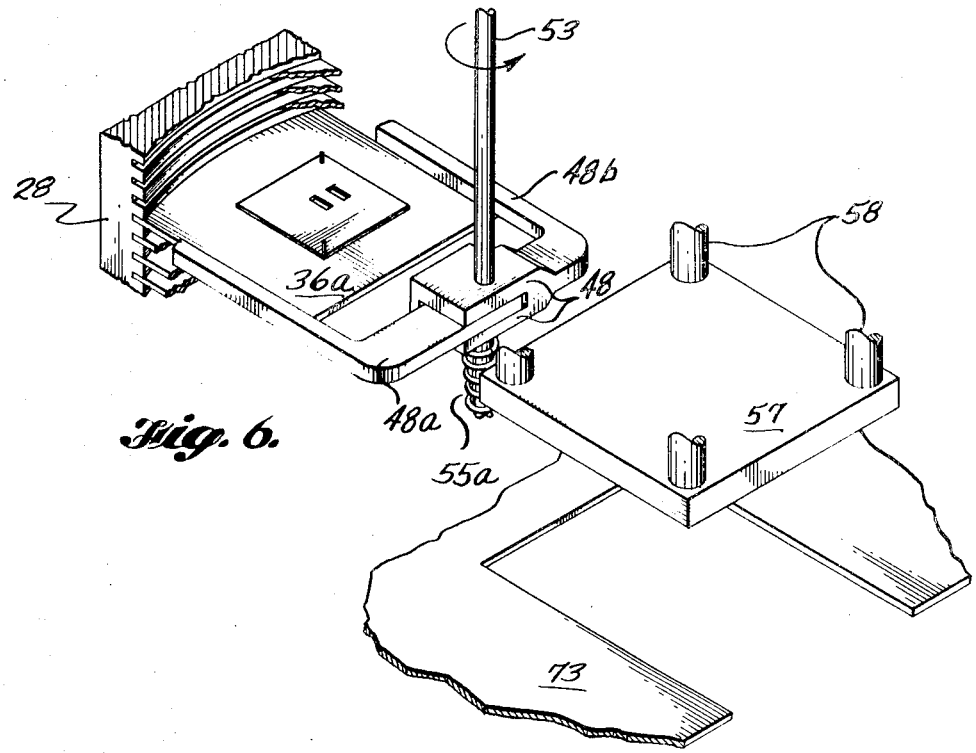
FIG. 6 is an isometric of a few of the working components of the embodiment shown in FIG. 1.
Figure 7:
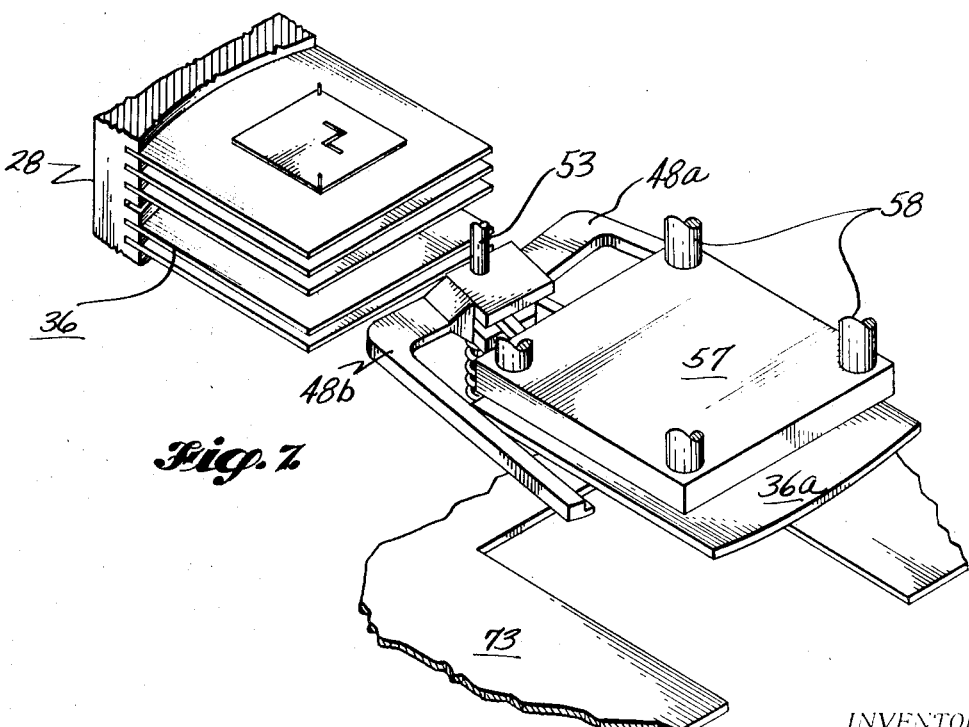
FIG. 7 is a second view of the working components as shown in FIG. 6.
Figure 8:
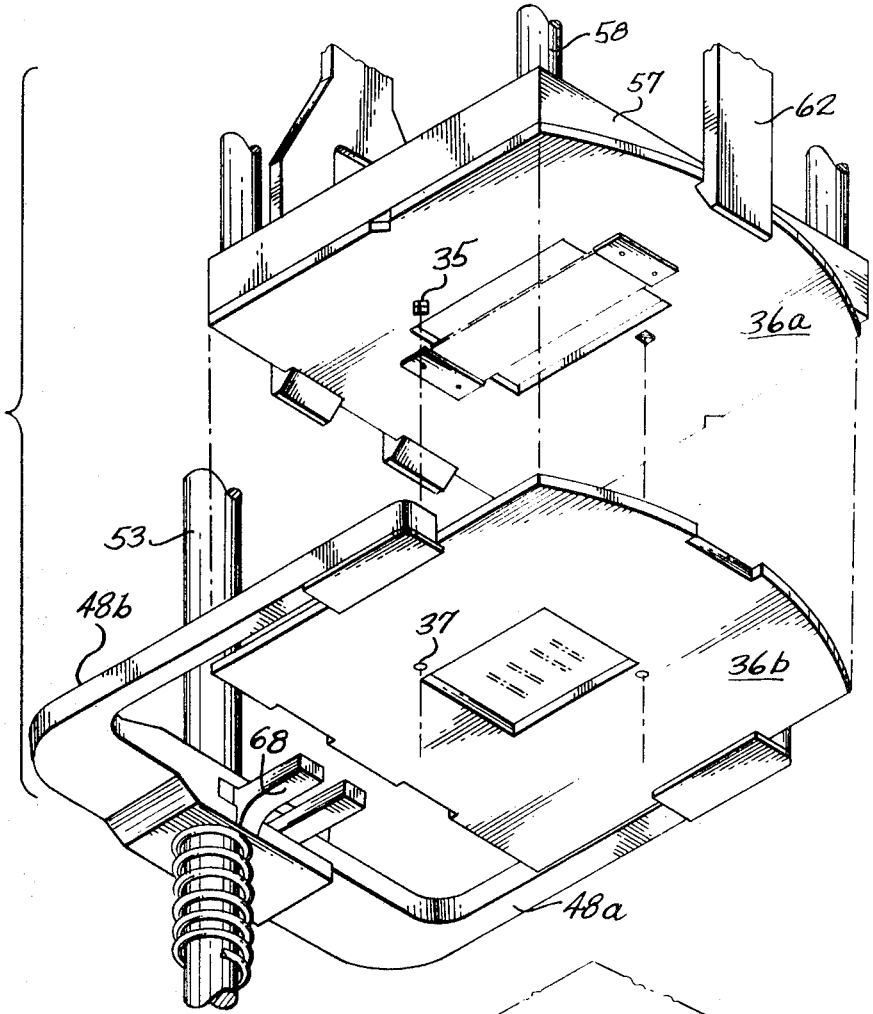
FIG. 8 is a third view of the working components shown in FIG. 6.

The substrate and mask clamp holder 46 is shown in FIGS. 6 and 7 to have a hinged joint 48 which is formed at support 53 by arm 48a and arm 48b of clamp holder 46. The portion of hinge joint 48 which is formed by arm 48b is fixedly attached to support member 53. Because of this attachment, clamp holder 46 will neither translate nor rotate independently of support member 53. The arm 48a, on the other hand, is spring-biased to cooperate with arm 48b in holding a mask or substrate 36 as shown in FIG. 6 and FIG. 8. Although arm 48a is prevented from translating independently of support member 53 by the portion of hinge 48 contributed by arm 48b, arm 48a does rotate about support member 53 independently thereof. It is necessary to cause arm 48a to rotate independently about support member 53 and against the force of the bias spring (not shown) in order to deposit and/or select a mask and/or substrate 36 from magazine 28 as shown in FIG. 6 and in order to place a mask and/or substrate 36 against a heater unit 57 as shown in FIG. 7. In order to place a mask and/or substrate 36 against heater 57 as shown in FIG. 7, spreader bars 68 integral with arms 48a and 48b of clamp holder 46, as shown in FIG. 1 and FIG. 8, are provided to cooperate with a spreader pin 66 as shown in FIGS. 1, 3 and 4. As will be described more fully below, during certain actuation of the drive means 50 as shown in FIG. 3, support member 53 is disposed to translate upward under the force of bias means 55a, rather than downward as described above. As seen in FIG. 1 and FIG. 8, the clamp holder 46 is moved upwards toward heater 57 by the force of bias means 55a; the spreader bars 68 thus come into contact with spreader pin 66. The spreader pin 66 increases the space between spreader bars 68 causing arm 48a to pivot independently about support member 53, thus releasing the mask or substrate 36 which is then supported at heater 57 by a solenoid-controlled clamp 62 to be described below. To cause arm 48a to pivot and rotate independently about support member 53 when clamp holder 46 is rotated into opening 40a as shown in FIG. 4, in order to deposit and/or select a mask and/or substrate 36 from magazine 28, another combination of means cooperates to overcome the force of the bias spring (not shown) which maintains arm 48a in a position of cooperation with arm 48b to grasp and support a mask and/or substrate 36. In FIG. 1, a stop bracket 70a (e.g., a piece of metal) is shown attached to arm 48a. A stop pin 70 is shown welded to the first fixed horizontal support 73. As the clamp holder 46 is rotated with support member 53 into position with respect to a vacant slot in magazine 28 which is accessible by opening 40a, stop bracket 70a comes into contact with stop pin 70 thus causing arm 48a to rotate independently of support member 53 to release the mask and/or substrate 36 into the appropriate slot in magazine 28.

As shown in FIG. 1 and FIG. 4, a heater 57 is shown in combination with heater support 58, a solenoid-controlled clamp 62 for holding in place against heater 57 substrates and masks 36. The solenoid 60 is automatically or manually actuated (by circuitry not shown), e.g., by programming or manual switching. The spring bias 64 which holds clamp 62 in its closed position is overcome by the solenoid 60 so that the clamp 62 is disposed to an open position to release the substrate 36a.

The cooperation of the above apparatus for selecting a desirable substrate and mask 36 and disposing the same to receive deposition of vaporized material from material source 22 is as follows. In FIGS. 1, 4 and 6, the clamp holder 46 is disposed within opening 40a to take from magazine 28 a particular mask or substrate 36 which has been referenced by magazine dial selector 29. For purposes of this illustration of operation it will be assumed that the heater 57 is as shown in FIG. 6; that is, the first item to be placed in position against heater 57 to be held by clamp 62 will be a substrate 36a. Thus, as shown in FIGS. 4 and 6, a substrate 36a upon which material is to be deposited will be taken from magazine holder 28 by clamp holder 46 and placed in position against heater 57 as shown in FIG. 7 in the following manner.

While the clamp holder 46 is in the position as shown in FIG. 6 and FIG. 4, proper actuation of the clamp actuator 46a shown in FIG. 1 causes clamp holder 46 to rotate with support member 53 in such a fashion that stop bracket 70a on arm 48a is caused to bias against stop pin 70 thus opening clamp holder 46 within opening 40a such that magazine 28 may be translated within magazine container 40 without interference between arms 48a and 48b of the clamp holder 46 and the mask or substrates 36. When the proper substrate 36a has been referenced with respect to opening 40a, clamp actuator 46a is actuated in the proper manner such that the bias action between stop bracket 70a and stop pin 70 is terminated, thus allowing the spring (not shown) to bring arm 48a into its closed position; that is, its clamping action is applied with arm 48b to the substrate 36a. Further actuation of actuator 46a in the same manner causes support member 53 and clamp holder 46, which now holds substrate 36a, to rotate in the direction as shown by the arrow in FIG. 6. The substrate 36a is thus brought into the position as shown in FIGS. 1 and 4a. The cam 55 has, in the meantime, rotated from its position as shown in FIG. 4 to its position as shown in FIG. 4a while the clamp holder 46 and its supported substrate 36a have rotated with support 53 from the position as shown in FIG. 4 to the position as shown in FIGS. 1 and 4a. In this rotation, due to cam design, cam 55 has not caused support 53 to translate. Further actuation of actuator 46a, and rotation of cam 55, will allow bias 55a to translate support member 53 upwards so that substrate 36a may be grasped by heater clamp 62.

Figure 4B:
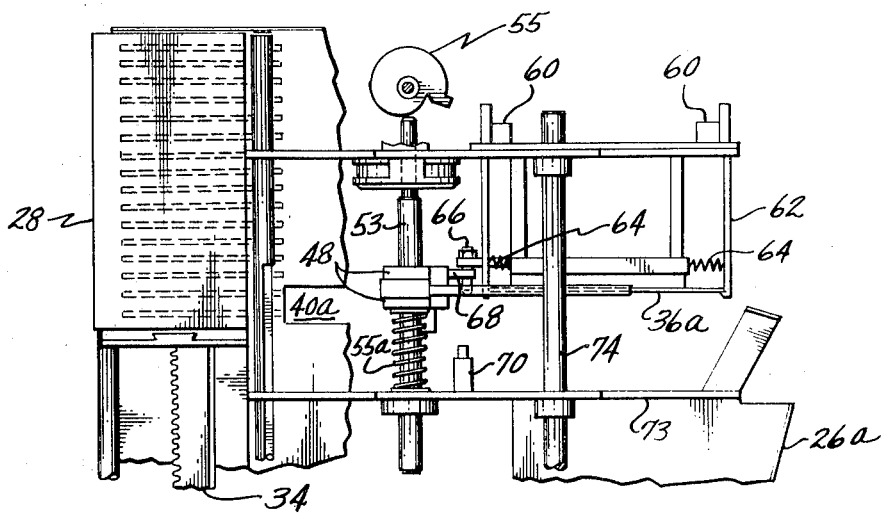
FIG. 4b is a second top section of the elevation shown in FIG. 1.

With the substrate 36a and clamp holder 46 in the position as shown in FIGS. 1 and 4a, Geneva wheel 54 has been disposed by rotation of gearing means 52a so that stop 54b no longer engages the cam slot (not shown) in wheel 54a. This latter relationship is clearly seen with reference to FIG. 3. Thus, further actuation of actuator 46a and drive means 50 will no longer cause support member 53 to rotate since stop 54b no longer drives within the cam slot (not shown) of wheel 54a. However, cam 55 will continue to rotate with actuation of actuator 46a and will permit support member 53, and concomitantly clamp holder 46 and substrate 36a, to translate upwards under the bias action of spring 55a, to the position shown in FIG. 4b. Spring 55a forces the tapered spreader pin 66 between spreader lugs 68 thus forcing apart arms 48a and 48b. At the same time, clamp 62 is forced open by the action of substrate 36a sliding along the tapered surface of clamp 62 (as seen in FIG. 8) under the driving force of spring 55a. Clamp 46 opens only enough to allow clamp 62 to retain substrate 36a as clamp 46 is moved away (biased downward against spring 55a) by actuation of actuator 46a. The solenoids 60 serve only to release substrate 36a by overcoming the clamping force of spring 64. The solenoids 60 are controlled as noted above and are actuated to release substrate 36a to be received by clamp 46 and returned to magazine 28 at the end of a deposition run. The action of the spreader pin 66 and the opening of the arm 48a can be seen with reference to FIG. 7.

Once the substrate 36a has been disposed in relationship to heater 57 and held by solenoid-controlled clamp 62, the clamp actuator 46a is actuated in the reverse order to that taken in removing substrate 36a from opening 40a and bringing it into relationship with heater 57. The next step involves referencing a mask 36b in like manner as substrate 36a was referenced with respect to opening 40a. The mask 36b, too, is taken from opening 40a by the clamp holder 46 and placed in relationship to heater 57 by attachment to substrate 36a in the manner as shown in FIG. 8.

Figure 8A:
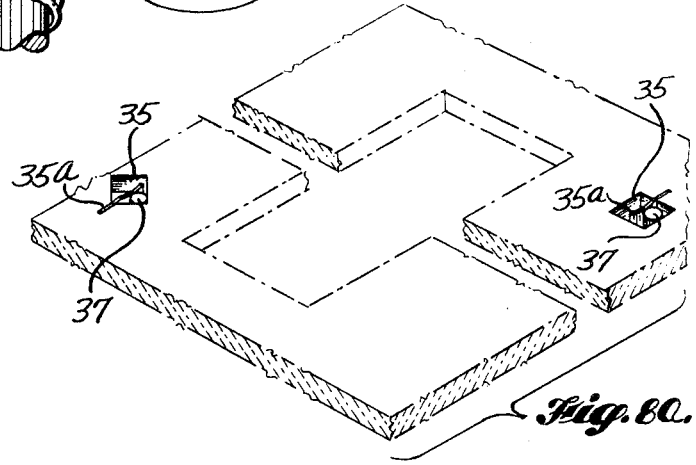
FIG. 8a is a detail of certain components shown in FIG. 8.

As seen in FIG. 8, each substrate 36a has a pair of substrate keyways 35. Each keyway 35 has a spring detent member 35a which is in its simplest form a small leaf spring. Each mask 36b is equipped with a pair of mask pins 37 also as shown in FIG. 8. With reference to FIG. 8a, a schematic illustration is shown of a mask and substrate 36 joined together as the mask pins 37 fit within substrate keyways 35 and are biased and held in place by the detent action of spring detents 35a. Thus, it is seen that as clamp holder 46 brings a mask 36b from magazine 28 and retraces the steps outlined above in disposing substrate 36a in its relationship to heater 57, the bias action of spring 55a will cause the mask pins 37 to be driven into the corresponding keyways 35 such that the mask 36b and substrate 36a are held together for the deposition of material from material source 22. Once the mask 36b has been disposed in place and held by the keyway 35 and spring 35a of substrate 36a, the clamp actuator 46a is actuated to rotate clamp holder 46 and place it out of the way within magazine container 40.

Once the mask and substrate 36 are positioned in place at heater 57, the desired material source 22 is selected by turnable mounting means actuator 13, current is applied and the material source 22 is vaporized. The vaporized material source 22 disperses upwards in the direction as shielded by shield 26a, and impinges upon substrate 36a in the pattern as dictated by the mask 36b. The above steps may be repeated in any number of steps desired. Varying patterns on substrate 36a are obtainable with various masks 36b due to the unique repeatability and reference indexing means of the instant invention.

Since numerous changes may be made in the above apparatus and different embodiments may be made without departing from the spirit thereof, it is intended therefore that all matters contained in the foregoing description or shown in the accompanying drawings shall be interpreted as illustrative and not in a limiting sense.

We claim:

1. In combination with a thin film circuit vacuum deposition apparatus of the type having a plurality of stations including a deposition station for retention of a substrate and mask during deposition of selected evaporant materials and a carriage means with gripping members for gripping and selectively transferring a substrate and mask to and from the deposition station, an improved means for retaining the substrate in the deposition station and for releasing the substrate from the carriage means comprising:

(a) means for vertically translating the carriage means into and out of the deposition station;

(b) spring biased clamp means depending from the deposition station adapted to engage and retain the substrate as the carriage means carrying the substrate is vertically translated into the deposition station;

(c) spreader pin means depending from the deposition station;

(d) a pair of spaced apart spreader lugs operatively associated with the gripping members of the carriage means and adapted to engagingly receive said spreader pin means therebetween to release the grip of the carriage means upon the substrate as the carriage means is vertically translated into the deposition station.

2. The combination as claimed in claim 1, wherein said carriage means comprises:

(a) a pair of gripping arms adapted to selectively grip the substrate, each of said gripping arms carrying one of said spreader lugs; and (b) spring means normally biasing said gripping arms toward one another to grip the substrate;

whereby said spreader pin means, when engagingly received between said spreader lugs, overcomes the bias of said spring means to release the grip of the carriage means upon the substrate.

3. The combination as claimed in claim 1, further including an improved cooperating registration means on the substrate and the mask for aligning the substrate with the mask at the deposition station comprising:

(a) a pair of pins and an associated pair of key ways operatively associated with the substrate and the mask, one of said key ways having a V-shaped notch adapted to receive one of said pins, the other of said key ways having a flat surface adapted to receive said other pin; and (b) spring detent means disposed within said key ways for biasing said pins into said V-shaped notch and one of said key ways and against said flat surface of said other key way.

References Cited

UNITED STATES PATENTS

| 2,239,770 | 4/1941 | Becker. | |
| 2,410,720 | 11/1946 | Dimmick | 118—49 |
| 2,745,767 | 5/1956 | Auwarter | 118—49 X |
| 3,117,025 | 1/1964 | Learn et al. | 118—49 |
| 3,206,322 | 9/1965 | Morgan | 118—49 X |
| 3,302,609 | 2/1967 | Walker et al. | 118—49 |
| 3,321,092 | 5/1967 | Brichard | 118—49 |
| 3,336,898 | 8/1967 | Simmonds et al. | 118—49 |
| 2,745,773 | 5/1956 | Weimer | 118—49 X |
| 3,023,727 | 3/1962 | Theodoseau et al. | 118—49 X |
| 3,228,794 | 1/1966 | Ames | 118—49 X |
| 3,238,918 | 3/1966 | Radke et al. | 118—49.1 |
| 3,312,190 | 4/1967 | Bradshaw | 118—49.1 |
| 3,314,395 | 4/1967 | Hemmer | 118—49 |

FOREIGN PATENTS 1,326,679  4/1963  France.

OTHER REFERENCES

Steiner: German allowed application St. 5,626, Mar. 1, 1956.

MORRIS KAPLAN, Primary Examiner

U.S. Cl. X.R.

29—211; 118—503; 214—1